US006997378B2

(12) United States Patent
Phillips et al.

(10) Patent No.: US 6,997,378 B2
(45) Date of Patent: Feb. 14, 2006

(54) RECURRENT BILLING MAINTENANCE SYSTEM

(75) Inventors: Susan Phillips, New York, NY (US); Paul M. Petersen, Phoenix, AZ (US); Patricia K. Peters, Chandler, AZ (US); Nancy S. Ganoe, Glendale, AZ (US); Maria S. Bailey, Phoenix, AZ (US); Lloyd G. Cato, Gilbert, AZ (US); Charles Milton, Scottsdale, AZ (US); Allan T. Zinky, Peoria, AZ (US); Tina Freeman, Conway, AR (US); Fred Griggs, Conway, AR (US); Donald H. Holt, Little Rock, AR (US); Alicia Cruz, Veronia, AR (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/843,732

(22) Filed: May 12, 2004

(65) Prior Publication Data

US 2004/0243638 A1 Dec. 2, 2004

Related U.S. Application Data

(63) Continuation of application No. 09/865,878, filed on May 25, 2001.

(60) Provisional application No. 60/206,916, filed on May 25, 2000.

(51) Int. Cl.
*G06F 17/60* (2006.01)

(52) U.S. Cl. .................................. 235/379; 705/30
(58) Field of Classification Search ............. 235/379; 705/30, 34, 67
See application file for complete search history.

(56) References Cited

U.S. PATENT DOCUMENTS

| 4,558,211 | A |  | 12/1985 | Berstein |
|---|---|---|---|---|
| 5,694,596 | A |  | 12/1997 | Campbell |
| 5,852,812 | A |  | 12/1998 | Reeder |
| 5,950,174 | A |  | 9/1999 | Brendzel |
| 5,960,416 | A |  | 9/1999 | Block |
| 5,970,470 | A |  | 10/1999 | Walker et al. |
| 5,983,200 | A |  | 11/1999 | Slotznick |
| 6,029,175 | A |  | 2/2000 | Chow et al. |
| 6,157,823 | A | * | 12/2000 | Fougnies et al. ........... 455/406 |
| 2002/0004770 | A1 | * | 1/2002 | Phillips et al. |

* cited by examiner

*Primary Examiner*—Karl D. Frech
(74) *Attorney, Agent, or Firm*—Snell & Wilmer L.L.P.

(57) ABSTRACT

A system for updating a merchant customer account database is provided, wherein the system may be used to update a merchant's customer database in response to changes made to a customer transaction account. The system provides a remote database location which stores a merchant's customer transaction account information for customers using the transaction account for recurring billing purposes. A server is used to manage the remote database information to update the remote database in response to changes in transaction account information. The updated transaction account information is then periodically provided to the merchant for use in updating the merchant's customer account database.

2 Claims, 13 Drawing Sheets

RECURRENT BILLING MAINTENANCE SYSTEM

REFERENCE TO OTHER DOCUMENTS

This application is a continuation of, and claims priority to, U.S. Ser. No. 09/865,878 filed on May 25, 2001, which itself claims priority to, and claims the benefit of, U.S. Provisional Application Ser. No. 60/206,916, filed May 25, 2000, which is hereby incorporated by reference.

BACKGROUND OF THE INVENTION

1. Field of the Invention

This invention generally relates to a recurrent billing maintenance system, and more particularly, to a system for automatically providing updates to a customer billing account information via a computer network 2. Description of the Related Art An increasing number of service organizations, stores, merchants, utilities, banks, Internet merchants and others (collectively "merchants") are enrolling repeat customers in a recurrent billing program, where a customer's transaction card (e.g., credit card) is automatically billed on a periodic basis. If a customer agrees to the recurrent billing feature, the customer provides the merchant with a credit card account number to which the billing amount is applied. The merchant may then establish a customer database of account numbers or customer numbers with additional information for charging the customer account.

Over time, authorization for some of the established recurrent billing accounts may be declined because the information in the merchant database is outdated. For example, a credit card provider may change a credit card account number or expiration date or simply cancel the customer's credit card privileges. Upon receiving. the "authorization declined" response from the transaction card company (e.g., the provider), the merchant typically contacts the customer to determine the cause of the decline. Alternatively, a merchant may continuously try to re-authorize the charge, hoping that the discrepancy which led to the "authorization declined" is removed and that the charge will eventually be accepted by the provider.

However, where the merchant attempts to. contact the customer, several problems may arise. For example, the customer may not be available or may not be aware that his credit card privilege status has changed. Further, the customer may be unwilling to provide the merchant with a supplemental or secondary transaction card suitable for recurrent billing. Moreover, for the merchant, updating of the information by, attempting to contact the customer may be inefficient and costly. The merchant may be faced with allotting additional workforce for carrying out a customer contact program which returns little in the way of answers and revenues. Further, where the customer's charge privileges have been revoked by a provider, it is often a difficult task for the merchant to secure another form of payment when the customer may just as well cancel the customer's enrollment in the merchant's recurrent billing program. That is, the declined authorization may provide the customer the opportunity to cancel the order or cancel the merchant's access to the transaction card. Consequently, a need exists for a system which would allow a merchant to update the merchant's recurrent billing database as changes to a customer's transaction card information occurs.

Presently; no known sufficient system or method for automatically providing updated recurrent billing customer database information to a merchant exists. There are various systems and methods described in the prior art, however, which address a similar problem. One such system which teaches a Distributed Information Logistics Service (DILS) that automatically retrieves updated files from a remote server for delivery to local client programs is disclosed in U.S. Pat. No. 6,029,175 issued Feb. 22, 2000 to Chow et al. (herein incorporated by reference). The system disclosed in Chow et al. uses a software agent called a Revision Manager which aids in insuring that a merchant may retrieve the most recent version of a document the merchant has previously accessed over a network.

The Revision Manager software disclosed in Chow et al., acts as a kind of client connected to a network server, which is capable of sending updated documents to a merchant who has previously accessed an older version of the document. In Chow et al., the merchant is able to identify for storage in a cache managed the Revision Manager, frequently used individual network retrievable documents. In one embodiment, the merchant is able to designate the frequency at which the Revision Manager notifies the merchant of changes to the identified documents. In another embodiment, the merchant will be automatically notified of changes when the merchant attempts to access a document's older version.

While the Chow et al. system may be adequate for automatically receiving updated documents over a network, the system is insufficient for use in updating a recurrent billing customer database. For example, the Chow et al. system does not enable a merchant to make changes to the documents stored in the Revision Manager Cache. Consequently, where a merchant wishes make a change to a recurrent billing customer's information (e.g., the customer account number), the Chow et al system is insufficient for providing a means to make the change.

Moreover, the Chow et al. system provides update services for only those documents specified by the Revision Manager system user. For a merchant who wishes to add a customer to a customer update database, Chow et al. offers no way of ensuring that the customer (e.g., document) maintains a valid transaction account. That is, where a merchant wishes to pre-authorize a customer transaction account prior to adding the customer to a system for providing updates, the Chow et al. system would be insufficient to accomplish the pre-authorization task.

It is therefore desired to create a system which will update a merchant's customer recurrent billing database in response to changes made to the customer billing information. A system of great advantage to the merchant may be able to update the merchant's customer database in response to changes made by the transaction account provider or by the merchant.

SUMMARY OF THE INVENTION

The present invention provides a method and system for updating a merchant's recurrent billing customer database which addresses many of the shortcomings of the prior art. In accordance with various aspects of the present invention, a merchant's recurrent billing customer database update system is provided, wherein the system may be used to update the merchant's customer database in response to changes made to a customer's credit card account (e.g., transaction account) information or credit card privilege status. In particular, a merchant may create a customer database storing the billing or credit card information of customers enrolled in the merchant's recurrent billing program. In addition, a corresponding database may be stored on a server managed and maintained by a customer's credit card provider. The credit card provider is preferably one selected by the customer to receive the merchant's recurrent bills, In accordance with this invention, updates which are made to the merchant customer database or to the provider customer database may be duplicated on the corresponding merchant or provider database.

In accordance with one aspect of the invention, an update system is provided wherein a file containing information pertaining to customers enrolled in a merchant's recurring billing program is stored in a predetermined location on a credit card provider's database. The customer file is managed, updated and maintained by the credit card provider. The credit card provider is further able to update the customer information stored in the customer file in response to actions taken by the provider which alter the customer credit card information or privilege status. The provider is then able to provide updated credit card information or status to the merchant for use in updating a corresponding merchant customer database. In accordance with this invention, the updated credit card information or status may be provided to the merchant on a fixed periodic basis (e.g., daily, weekly, monthly, etc.) or upon request by the merchant.

In accordance with another aspect of the invention, an update system is provided wherein a merchant may update the customer information stored on a merchant system database and further have the updated information checked against an existing provider customer database. In response to actions taken by the merchant to alter the customer credit card information, the provider is then able confirm the merchant's changes and update a customer database located on the provider server to reflect the changes made to the corresponding merchant customer database on the merchant system:

BRIEF DESCRIPTION OF THE DRAWINGS FIGURES

A more complete understanding of the present invention may be derived by referring to the various exemplary embodiments of the present invention which are described in conjunction with the appended drawing figures in which like numerals denote like elements, and in which.

Figure 11:
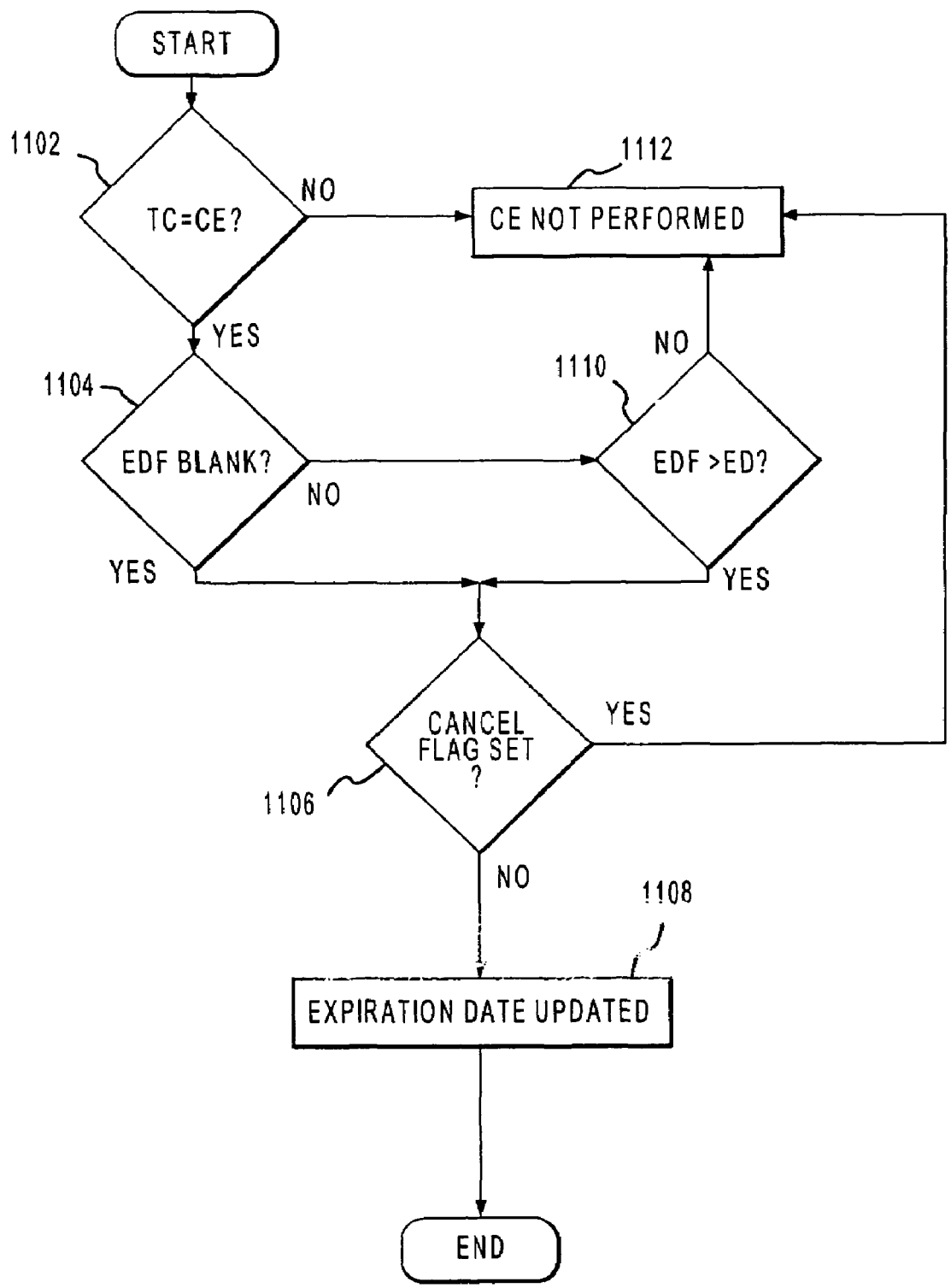
Figure 12:
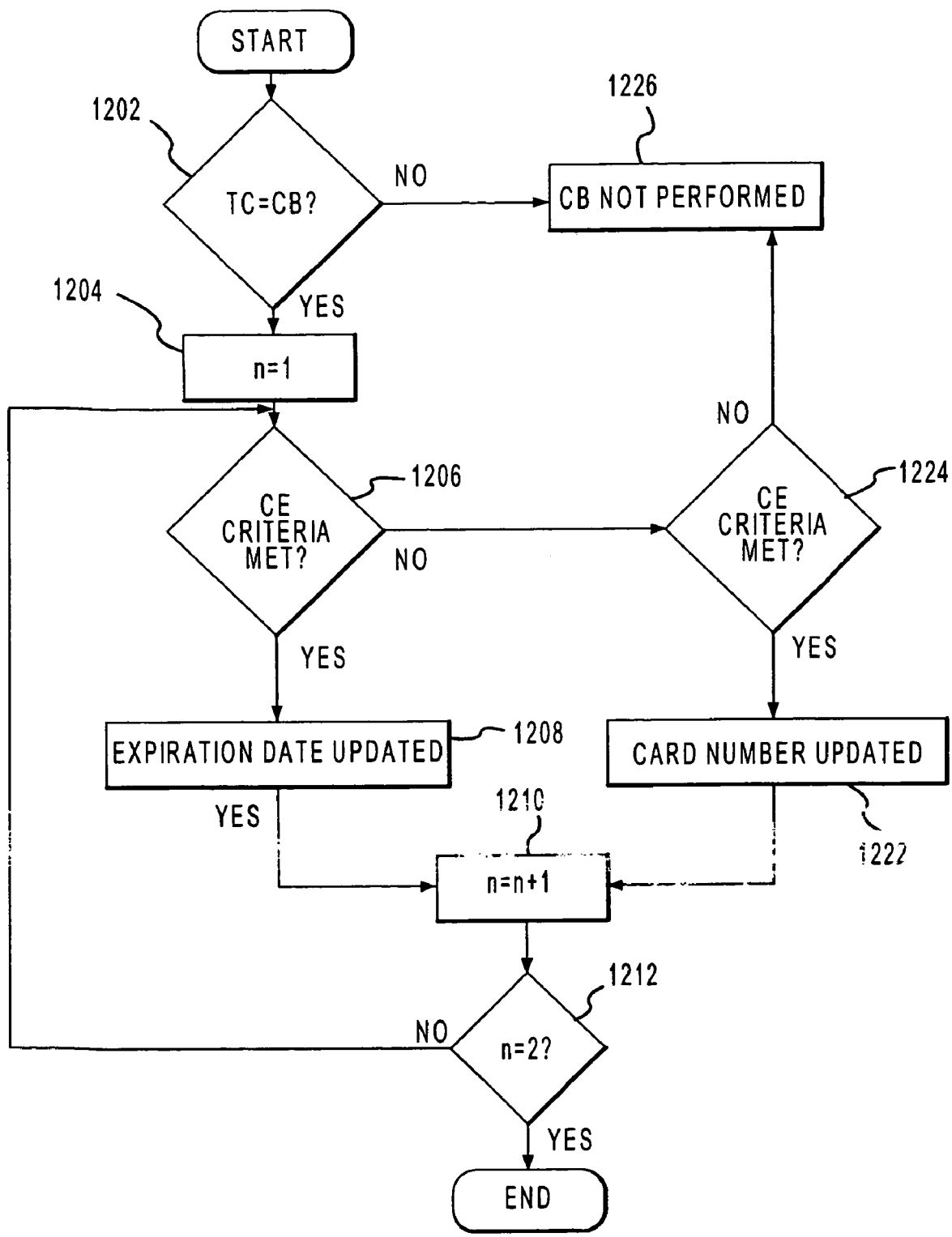

FIG. 11 is an exemplary embodiment of a process for performing a provider "change expiration date" transaction in response to a provider "change expiration date" transaction code in accordance with the present invention; and FIG. 12 is an exemplary embodiment of a process for performing a provider "change both" transaction in response to a provider "change both" transaction code in accordance with the present invention.

DETAILED DESCRIPTION OF VARIOUS EXEMPLARY EMBODIMENTS

The present invention may be described herein in terms of functional block components and various processing steps. It should be appreciated that such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction or file transmission system.

To simplify the description of the exemplary embodiment, the invention is described as pertaining to a system for updating an individual credit card holder's account information using a system running over a computer network such as the Internet. It will be appreciated, however, that many applications of the present invention could be formulated. For example, the system could be used to automatically update a group membership information database, any relevant demographic database, or any other purpose. Further, it should be appreciated that the network described herein may include any system for exchanging data or transacting business, such as the Internet, an intranet, an extranet, WAN, LAN, satellite communications, and/or the like. That is, communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Further, the present invention might employ any number of conventional techniques for data transmission, signaling, data processing, network control, and the like. For example, radio frequency (RF) or other wireless techniques could be used in place of any network technique described herein.

Further still, the terms "Internet" or "network" may refer to the Internet, any replacement, competitor or successor to the Internet, or any public or private internetwork, intranet or extranet that is based upon open or proprietary protocols. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHN, TCP/IP CLEARLY EXPLAINED (1997). All of these texts are hereby incorporated by reference.

Furthermore, the merchant and the provider, described herein, may represent individual people, entities, or business, and while reference is made to American Express®, or any other credit card provider, this is by way of example and the financial authorization entity may represent various types of card issuing institutions, such as banks, credit card companies, card sponsoring companies, or third party issuers under contract with financial institutions. The payment network includes existing proprietary networks that presently accommodate transactions for credit cards, debit cards, and other types of financial/banking cards, such as, for example, the American Express®, and VisaNet® network.

Figure 1:
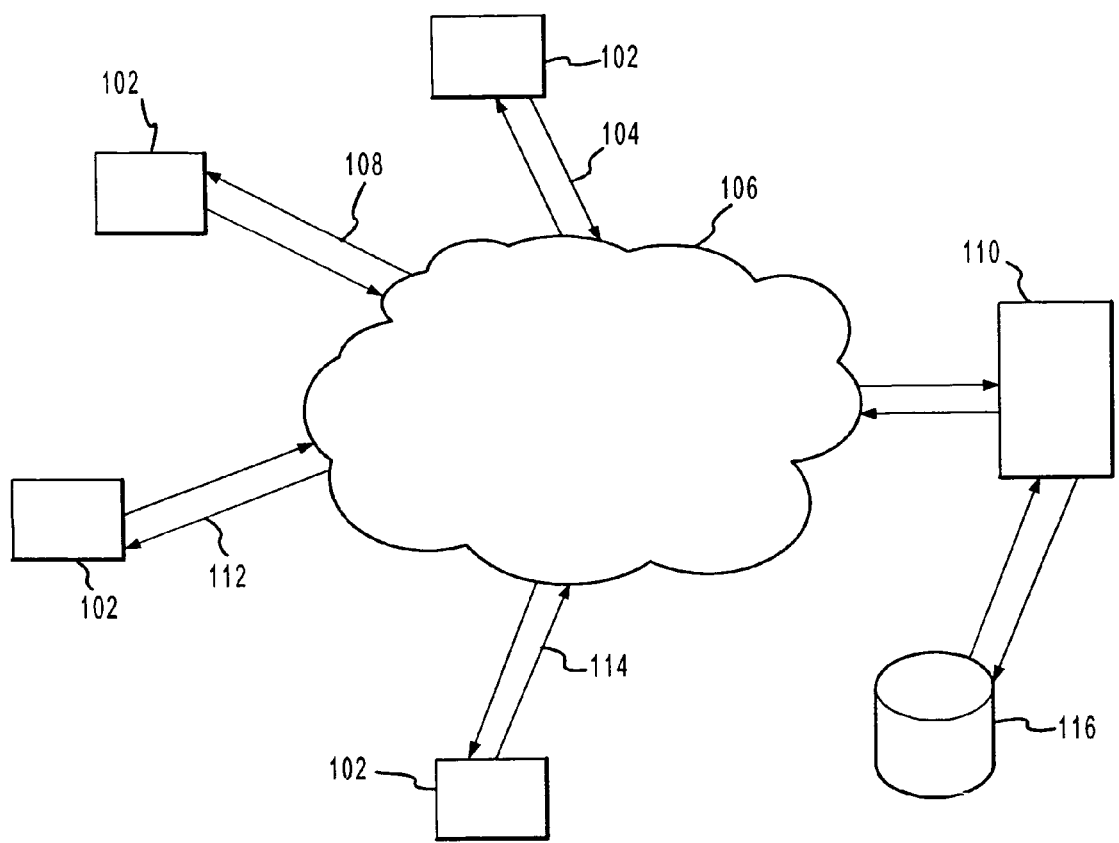
FIG. 1 is a block diagram of an exemplary embodiment of the merchant recurrent billing customer database update system in accordance with the present invention.

FIG. 1 is a block diagram of an exemplary merchant data file transfer and update system 100 in accordance with this invention. With reference to FIG. 1, in general, a number of merchant systems 102 communicate with a server system 110 via a network 106 to send and/or receive database files containing information related to individual customer credit card accounts. In an exemplary embodiment, server 110 suitably maintains distinct data file groupings for each individual merchant system 102 and retrieves the distinct data files to perform. updating as requested by merchant systems 102. While the terms "credit card accounts" or "credit card" may be used in the exemplary embodiments, the invention contemplates the use of any type of financial or transaction account, whether or not associated with a physical card, such as, for example, debit card, charge card, smart card, bar coded card, magnetic stripe card, temporary use account number, brokerage account, 401K plan, stock account, telephone account, utility account, loyalty point account, and/or the like. One such transaction account which is suitable for use with this invention is the described by Bishop et al., in the U.S. patent application Ser. No. 09/652, 899 entitled "Methods and Apparatus for Conducting Electronic Transactions" filed Aug. 31, 2000 (herein incorporated in its entirety by reference).

Merchant system 102 may include any convenient combination of hardware and software components configured to allow a merchant to communicate over network 106. For example, merchants system 102 might include a standard personal computer (PC) comprising a CPU, monitor, storage, keyboard, mouse, and communication hardware appropriate for the given data link 104 (e.g., V.90 modem, network card, cable modem, etc.). In alternate embodiments, merchant system 102 is a personal data assistant (PDA) capable of manipulating images and communicating with server 110. Merchant systems 102 typically include an operating system (e.g., Windows 95/98/2000, Linux, Solaris, MacOS, and/or the like) as well as various conventional support software modules and drivers typically associated with computers Merchant system 102 may also include application software configured to communicate over network 106 with server 110, for example, a world wide web (WWW) browser or any other communication software. In an exemplary embodiment, merchant system 102 includes a conventional Internet browser application that operates in accordance with HTML and HTTP protocols such as Netscape Navigator (available from-the Netscape Corporation of Mountain View, Calif.) or Microsoft Internet Explorer (available from the Microsoft Corporation of Redmond, Wash.).

Merchant system 102 and server 110 are suitably coupled to network 106 via data links 104, 108, 112 and 114, respectively. A variety of conventional communications media and protocols may be used for data links 104, 108, 112 and 114. Such links might include, for example, a connection to an Internet Service Provider (ISP) over the local loop as is typically used in connection with standard modem communication, cable modem, Dish networks, ISDN, Digital Subscriber Line (DSL), or various wireless communication methods. Merchant system 102 might also reside within a local area network (LAN) which interfaces to network 106 via a leased line (T1, D3, etc.). Such communication methods are well known in the art, and are covered in a variety of standard texts. See, e.g., GILBERT HELD, UNDERSTANDING DATA COMMUNICATIONS (1,996), hereby incorporated by reference.

Server 110 comprises any number of hardware, software, and networking components suitable to provide a user interface to a network that is accessible by users, and which provides the functionality described in further detail below. In one embodiment, Sun Ultra SPARC Enterprise 250 and 450 servers are used in conjunction with a Sun Solaris 7 or Linux operating system, Apache web server software, and an Oracle 8 or MySQL database system. Of course particular hardware and software components used in server 110 will vary widely from embodiment to embodiment, Furthermore, server 110 may represent a "cluster" or group of separate computer systems providing. the functionalities described herein.

The merchant database locations maintained on database 116 by server 110 are provided a distinct merchant identifier. Database 116 may be a graphical, hierarchical, relational, object-oriented or other database, and may be maintained on a local drive of server 110 or on a separate. computer coupled to server 110 via a local area or other network (not shown). In one embodiment, database 116 is a collection of ASCII or other text-files stored on a local drive of server 10. Merchant database information is suitably retrieved from database 116 and provided to user systems 102 upon request via a server application, as described more fully below.

In one embodiment, the server 110 is man aged by a credit card provider with which the merchant has established a billing account. The billing account may be associated with any suitable credit card service such as Visa®, Master-Card®, American Express®, Discover®, or the like. Further, the billing account may additionally allow the merchant to recover payment for charges made through the merchant by an individual customer who is a subscriber of the credit card service. It should be noted that although the present invention is described with relation to a credit card service, the invention is not so limited. That is, the invention is suitable for use with any system wherein the customer is billed on a periodic basis.

Within each merchant database location on database 116, there is stored a plurality of individual data locations corresponding to the credit card accounts of credit card holders who have elected to enroll in the merchant's recurrent billing program. For example, a merchant may have a plurality of American Express® cardmembers who have elected to subscribe to the merchant's recurrent billing program. Where American Express® manages the credit card server 110, American Express® establishes a unique database location on database 116, which houses current information related to the merchant's recurrent billing customers (e.g., merchant assigned customer number, credit card number and expiration date) who are using their American Express to recurrent billings. The database location will be assigned an identifier which can be recognized as belonging to a particular merchant. However, in order for American Expresse® to maintain a database location for a particular merchant, the merchant database information. (e.g., customer number, credit card number and expiration date) is first provided to the database 116. That is, in an exemplary embodiment, a merchant performs an "initial registry" process for providing the information to the credit card provider.

Figure 2:
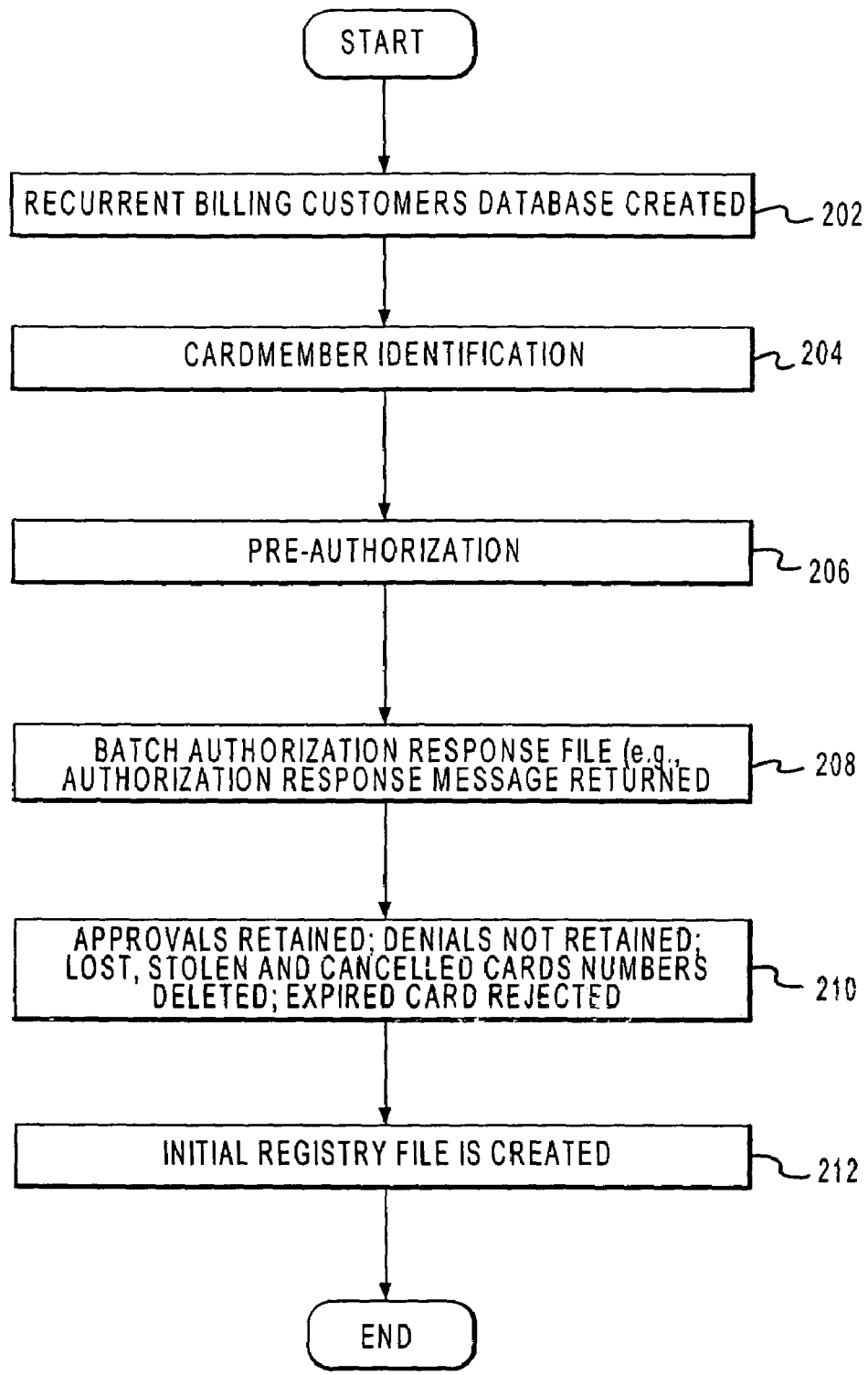
FIG. 2 is a block diagram of an initial registry process in accordance with the present invention.

FIG. 2 is an exemplary initial registry process for obtaining merchant database information from merchant system 102 for storage on database 116 via network 106. As shown, the merchant creates a customer data base of all customers enrolled in the merchant's recurrent billing program (step 202). Typically, this database will have varying customers using different recurrent credit card services for billing purposes. That is, the merchant system 102 database may comprise a database where a first plurality of customers are using Visa®, a second plurality of customers are using MasterCard®, a third plurality of customers are using American Express®, and so on.

The merchant further creates a cardmember working file of those customers who are using one particular credit card provider as their credit card for recurrent billing (for example, American Express®) (step 204). The American Express® cardmember working file contains cardmember information such as merchant assigned customer number, corresponding cardmember credit card number and card expiration date which are used to identify the cardmember at the merchant location on database 116. However, prior to storing the cardmember information on database 116, the cardmember information may be pre-authorized (step 206) to insure that the information being provided by the customer is valid.

Figure 3:
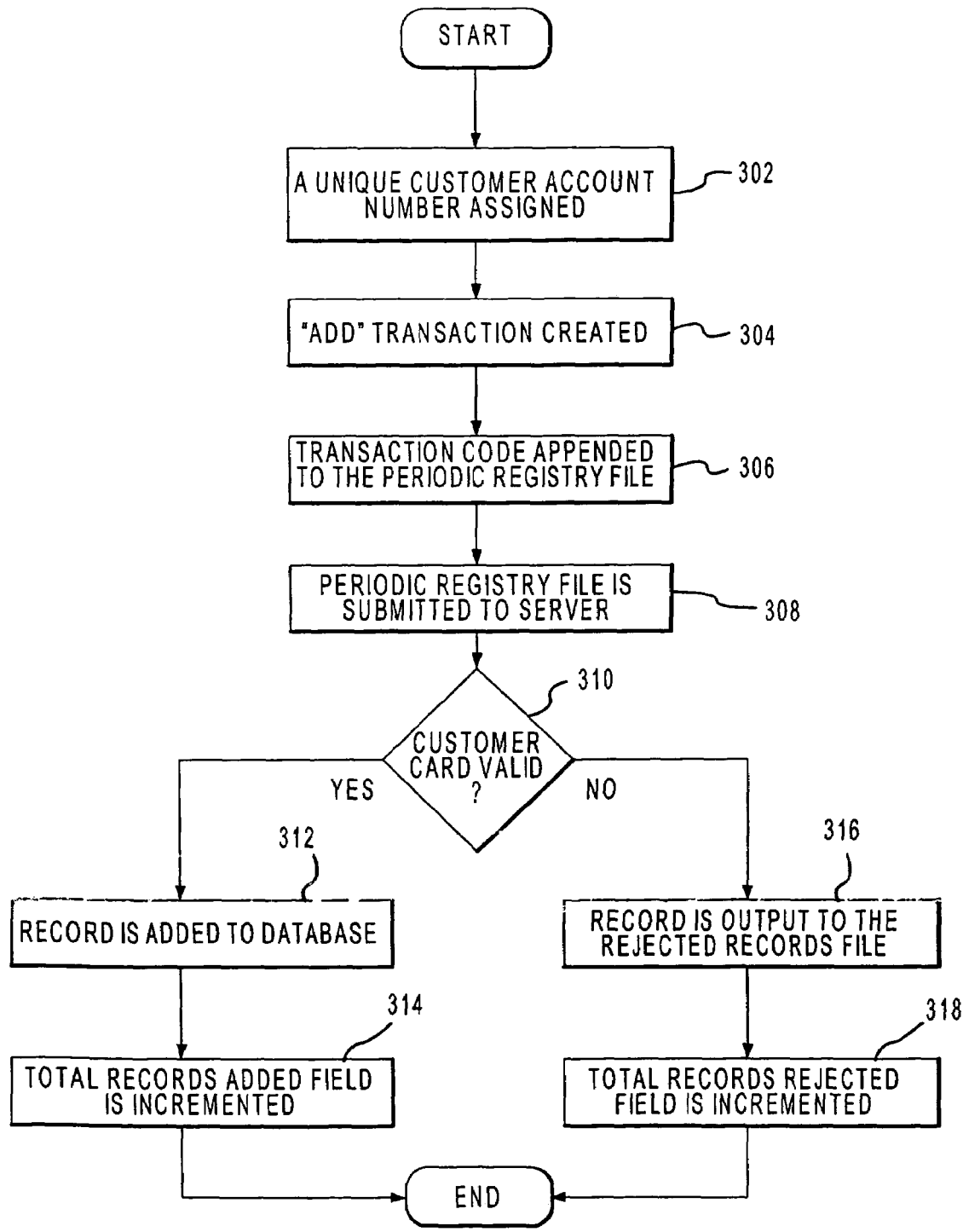
FIG. 3 is an exemplary embodiment of a process for performing a merchant "add" transaction in response to a merchant "add" transaction code in accordance with the present invention.

In an exemplary pre-authorization process (step 206), the merchant creates a batch authorization request in the form of an Authorization Request Message for forwarding to the credit card service provider. FIG. 3 is a flowchart of an exemplary process which may be used by a merchant for creating an addition to their registry file (i.e. the Authorization Request Message) The merchant further assigns a unique customer number to customer credit card information to aid in identifying the customer credit card information throughout the initial registry and update process (step 302). Further, the merchant creates an "add" transaction for the customer credit card information. (step 304) by appending a merchant "add" transaction code to the customer account number and related customer credit card information (step 306). The customer account information and customer credit card information with the appended merchant "add" transaction code is then forwarded to the credit card provider server 110 (step 308) where the customer credit card information (e.g., credit card and expiration date, etc) is compared to the credit card provider's own database of current cardmember credit card information (step 310). If a merchant provides customer credit card information which is also found on (e.g., matches) the credit card provider's own database of current cardmembers, the customer credit card information is deemed valid and is then added to the merchant's database location (also called, "billing database" location) on the credit card provider's database 116 (step 312). If the customer credit card information is not found on the credit card provider's database of current cardmembers, the specific customer credit card information is rejected and is then placed in a rejected records file (step 316) for later reporting to the merchant.

In order to assist the merchant in determining which files are accepted and which files are rejected, the credit card provider's server 110 generates an Authorization Response Message (also called a "Summary Report") containing the decision codes appended to each customer account operated on by the server 110 (step 208). The Authorization Response Message may contain a numerical tally of the number of customer accounts which are deemed valid and which are rejected (steps 314 and 318). In one embodiment, the number of rejected files may be placed in a rejected records file and included in the Summary Report provided to the merchant. In another embodiment the rejected Records file may be provided to merchant independently of the Summary Report.

The decision codes which are appended to the customer accounts in the Authorization Response Message may aid the merchant in determining whether a particular customer credit card information has been accepted or rejected, and, further what the appropriate action should be for the merchant with regards to the particular customer credit card information. Table 1 below shows typical decision codes which may be used in an Authorization Response Message in accordance with this invention.

TABLE 1

Decision Codes

| Decision Code | Decision Code Description | Eligible for Update Service |
|---|---|---|
| ab | Approved | Yes |
| cd | Please Call Credit Card Issuer | Yes |
| ef | Approved - Authorization Plus Program | Yes |
| gh | Deny-New Card Issued | No |
| ij | Deny Confiscate Card | No |
| kl | Deny | No |
| mn | Deny - Account Cancelled | No |
| op | Approve with Positive ID | Yes |
| qr | Please Wait | N/A |
| st | Edit Error | N/A |

Once the Authorization Response Message is received by the merchant, the merchant may create a registry file on the merchant system 102 containing all customer credit card information which has been accepted by the credit card server 110 in step 208 (step 210). Further, the information contained in the merchant registry file may be duplicated in the form of an initial registry file in the merchant database location on database 116 using the customer account numbers and customer credit card information (steps 312 and 220). In one embodiment, the initial registry file may be created when all accepted customer information is stored on the merchant location in database 116. In another embodiment, the initial registry file may be created prior to providing the Authorization Response Message back to the merchant. In yet another embodiment, the merchant may create the initial registry file by compiling a duplicate file including the customers the merchant currently has stored on the merchants recurring customer database. This should be done after going through pre-authorization process. Merchant sends Initial Registry file to BillingWatch (server 110) to be added to database 116. As previously mentioned, it may be desirable for a merchant to update the initial registry file in response to the merchant's daily activities. For example, where a merchant wishes to add a customer to his initial registry file, change a customer's credit card information, or delete a customer from his initial registry file, the merchant may submit a batch file to the credit card server comprising the relevant customer's or customers' information. Such a file called a periodic registry file, may be submitted periodically (e.g., daily, weekly, monthly, etc.) to the server 110. In addition, the periodic registry file may contain a plurality of individual customer numbers and related customer credit card information, appended with a merchant transaction code used to indicate what action should be taken with the customer file. One method of submitting the periodic registry file to the server 110 involves placing the periodic registry file on a drop-off location on the server where it may be later accessed and retrieved by the merchant. In one embodiment, the server monitors the frequency at which a merchant submits periodic registry files to aid in determining the value of the server 110 service to the merchant, or to assist in determining the amount of database storage space to allot the merchant on database 116, and the like.

In this instance, the merchant transaction code identifies for the server 110 the appropriate action to be performed with respect to a particular customer information stored in the merchant billing database location on the database 116. For example, where a merchant wishes to "add" a new customer to his billing database location, the merchant appends merchant transaction code "A" to the customer number and customer credit card information. Other possible merchant transaction codes may be used, and are shown below in Table 2.

TABLE 2

Merchant Transaction Codes

| Transaction Type | Transaction Code | Events or Actions That Might Warrant this Transaction |
|---|---|---|
| Add | A | New customer enrolling in recurrent billing<br>Existing customer enrolling in recurrent billing |
| Change | C | Customer notifies merchant of change in credit card information |
| Delete | D | Customer cancels enrollment in recurring billing program<br>Merchant wants to change merchant-assigned customer number associated with a recurring billing enrollee. This delete transaction may be followed up with an "add" transaction to add new merchant assigned customer account number. |

It should be understood that the above list of merchant transactions is not exhaustive, and as such, other merchant transaction codes may exist. For example, a merchant transaction code, "NC" may exist for a transaction which changes an enrollee's billing card from a personal to a corporate card, or the like. Further, while not shown above, the merchant transaction codes may be used in combination in the instance where a merchant may wish to perform more than one transaction on a customer account. That is, it should be understood that other possible combinations of merchant transaction codes may exist, and the ones listed in Table 2 are used herein merely for illustrative purposes.

Figure 4:
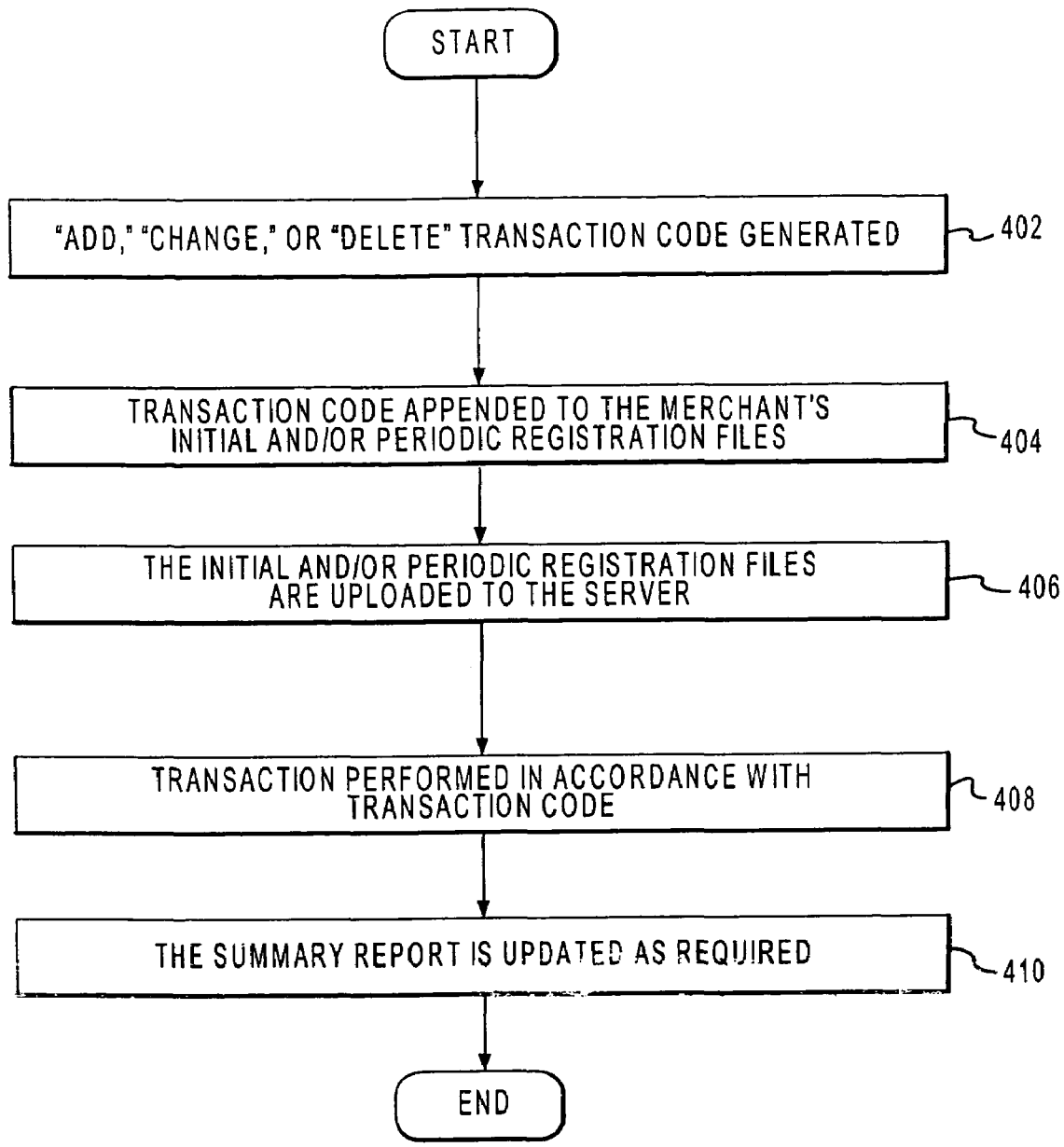
FIG. 4 is an exemplary embodiment of a process for updating a merchant billing database and generating a Summary Report in accordance with the present invention.
Figure 5:
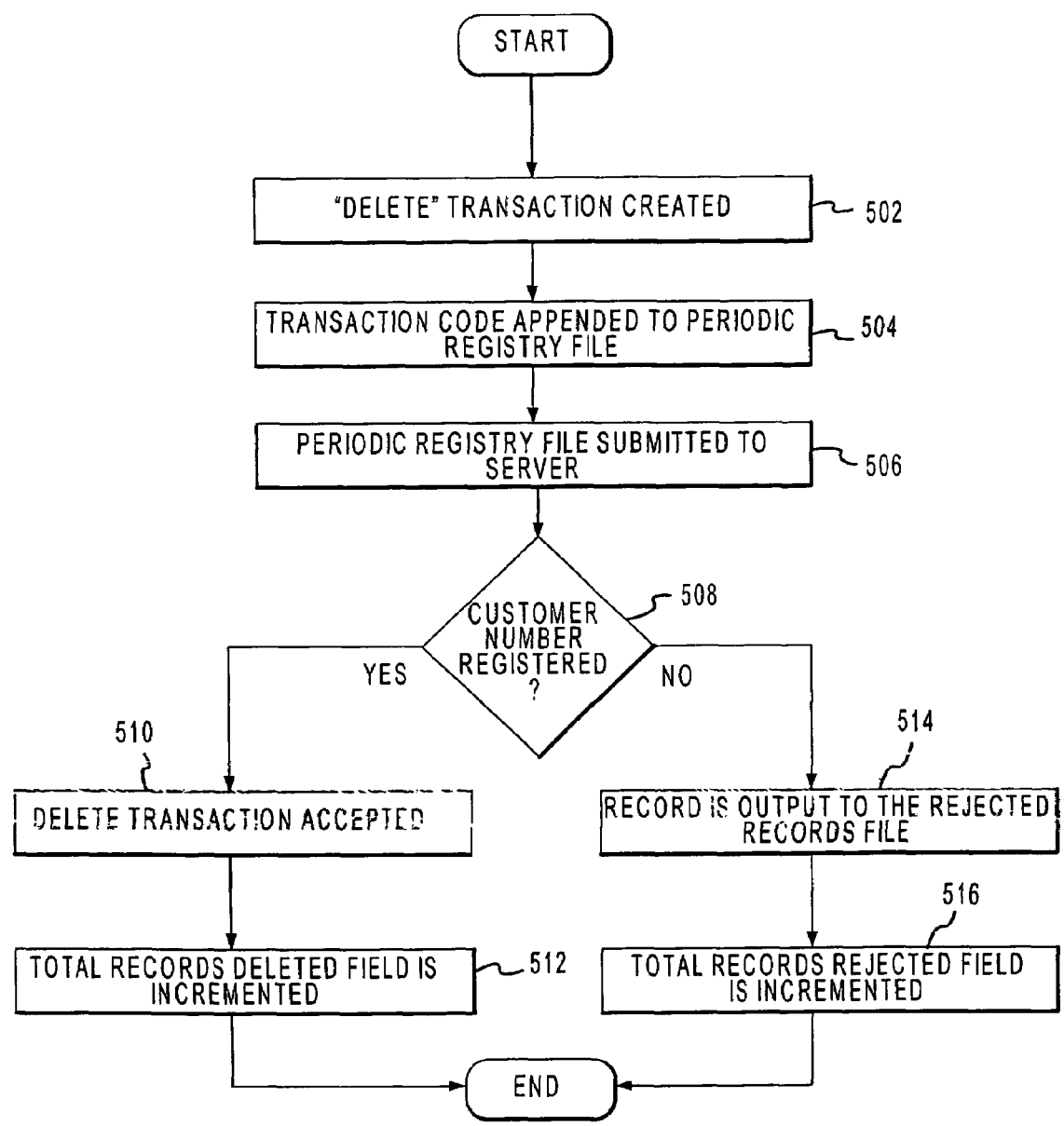
FIG. 5 is an exemplary embodiment of a process for performing a merchant "delete" transaction in response to a merchant "delete" transaction code in accordance with the present invention.

As noted, a merchant who wishes to update its billing database location will engage in a periodic registry process. Illustrated in FIG. 4 are the steps of an exemplary periodic registry process for use with this invention. The merchant may generate a periodic registry file as described above (step 402). The periodic registry file may append a merchant transaction to the individual customer accounts indicating the appropriate server transaction to be taken (step 404). The periodic registry file is then uploaded on the server 110 (step 406) and the server 110 performs the appropriate action as indicated (step 408). As with the initial registry process, the server prepares a Summary Report enumerating for the merchant which transaction requests were performed and which were rejected (step 410).

As noted above, the server 110 performs the appropriate transaction as indicated by the merchant transaction code (step 408). FIGS. 5–7B illustrate the exemplary steps which may be performed for a given merchant transaction. For example, the steps shown in FIG. 5 may be performed by the on database 116 where a merchant wants to "delete" a cardmember from the merchant's billing database location (e.g., card holder dis-enrolls in recurrent billing service). In this exemplary process, the merchant creates a "delete"

transaction by appending the transaction code to a customer number and customer credit card information file (step 502). The merchant may append the "delete" transaction to the periodic registry file and submit the file to the credit card provider server 110 (step 506). The database 116 may then be checked to determine if the customer number or customer credit card information is included on the merchant files stored on the merchant's billing database location (step 508). That is, with-respect to database 116, the server 110 may compare the customer number and/or related customer credit card, information with those stored in the merchant's billing database location to determine if the customer may be found on., the database. If the customer number and/or information is found on the billing database, then the server will accept the merchant's "delete" transaction (e.g., delete the customer from the billing database location) and increment the Summary Report accordingly (steps 510 and 512). In one embodiment, the Summary Report may contain a data field for use by the server 110 to note which record has been deleted. In addition, Summary Report may contain a counter for incrementing in accordance with the number of merchant "delete" transactions which were accepted on database 116.

It should be noted, that in the instance where the customer number and/or information is not found on the billing database location by the, the merchant "delete" transaction request is placed in a rejected records file (step 514) in similar fashion as was done in the initial registry process described above. In: addition, the rejected records file may contain a counter which may be incremented in accordance with the number of merchant "delete" transactions rejected on the database 116.

Figure 6:
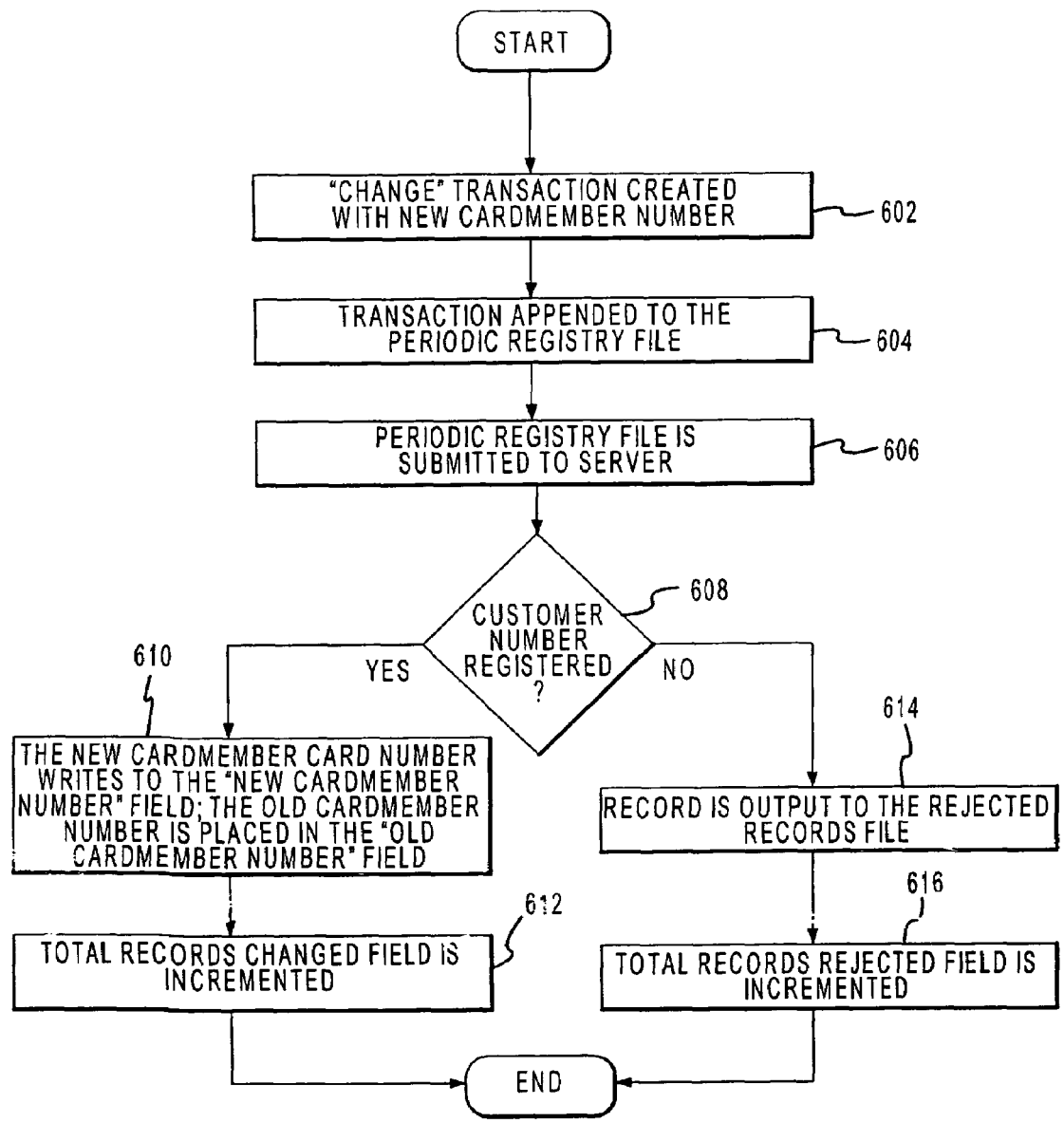
FIG. 6 is an exemplary embodiment of a process for performing a merchant "change" transaction in response to a merchant "change" transaction code in accordance with the present invention.

FIG. 6 shows an exemplary merchant "change" transaction process which may be used with the present invention. Where a merchant wishes to make a "change" to a customer's information stored on the billing database location, the merchant may create a "change" transaction by appending the transaction code to a customer number and customer credit card information file (step 602). The merchant may then append the "change" transaction to the periodic registry file (step 604) and submit the file to the server 110 (step 606). The server 110 may then check the customer number or customer credit card information against the merchant files stored on the merchant's billing database location (step 608). That is, the server 110 may compare the customer number and/or related customer credit card information with those stored in the billing database location to determine if the customer may be found on the database. If the customer number and/or information is found on the billing database location, then the server will accept the merchant's "change" transaction (e.g., change the customer information in the billing database location) and increment the Summary Report accordingly (steps 610 and 612). In one embodiment, the Summary Report may contain a data field for use in noting which record has been changed. In addition, the Summary Report may contain a counter for incrementing in accordance with the number of merchant "change" transactions which were accepted on database 116.

Similar to the action taken with the merchant "delete" command described above, in the instance where the customer number and/or information is not found on the billing database location, the merchant "change" transaction request may be placed in a rejected records file (step 614) in similar fashion as was done in the initial registry process. The rejected records file may contain a counter which may be incremented in accordance with the number of merchant "change" transactions which were rejected on-database 116.

Where a merchant has a new enrollee in his recurring billing system, the merchant may wish to "add" the customer to his billing database location for management by the server 110. In this instance, the merchant would create a merchant "add" transaction in substantially similar manner as was done during the initial registry process. That is, a new enrollee to the merchant recurrent billing system may be added to the merchant billing database location in much the same way as was illustrated and described in FIG. 2. As such, the description will not be repeated here in the interest of brevity.

Figure 7A:
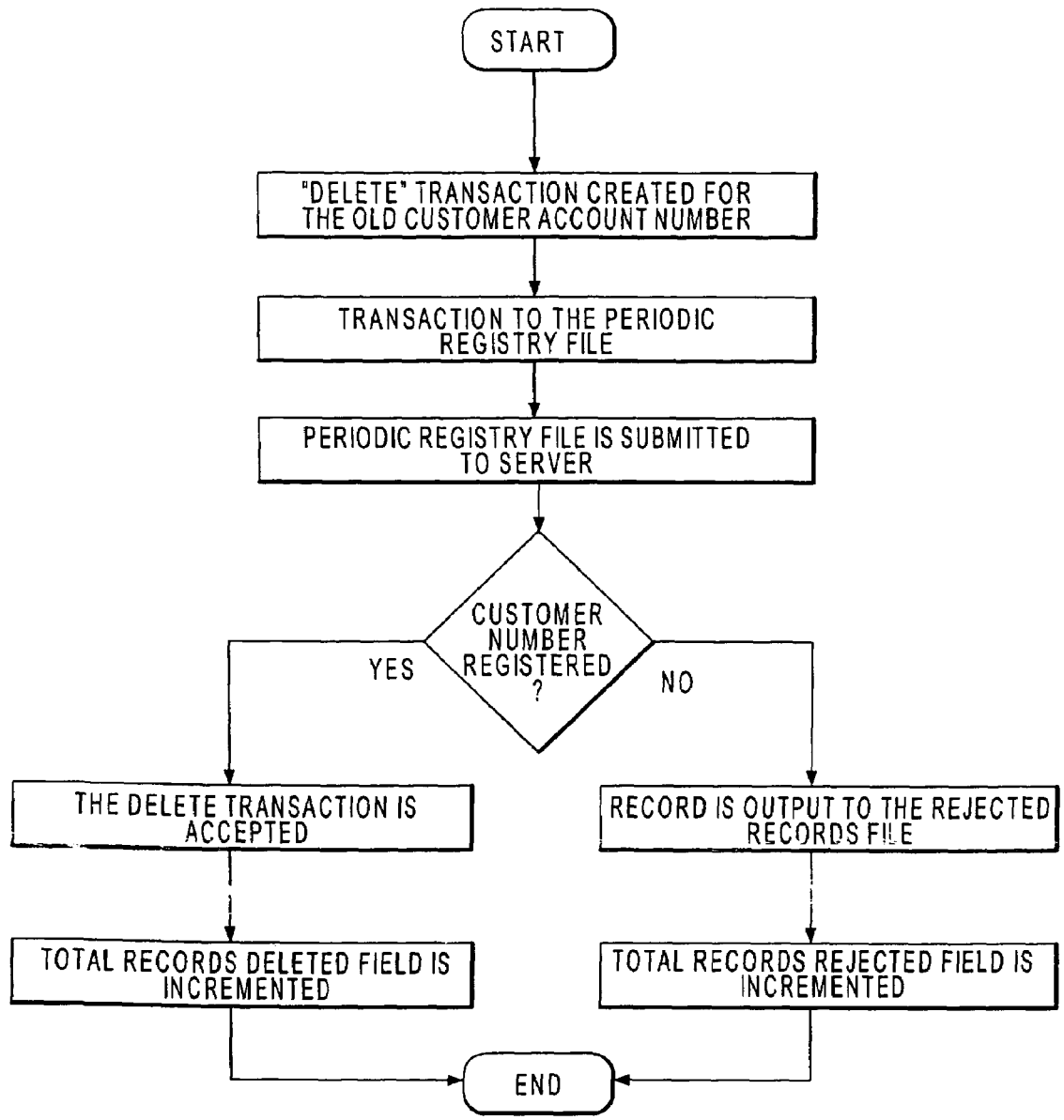
FIGS. 7A and 7B are another exemplary embodiment of a process for performing a merchant "change" transaction in response to a merchant "change" transaction code in accordance with the present invention.
Figure 7B:
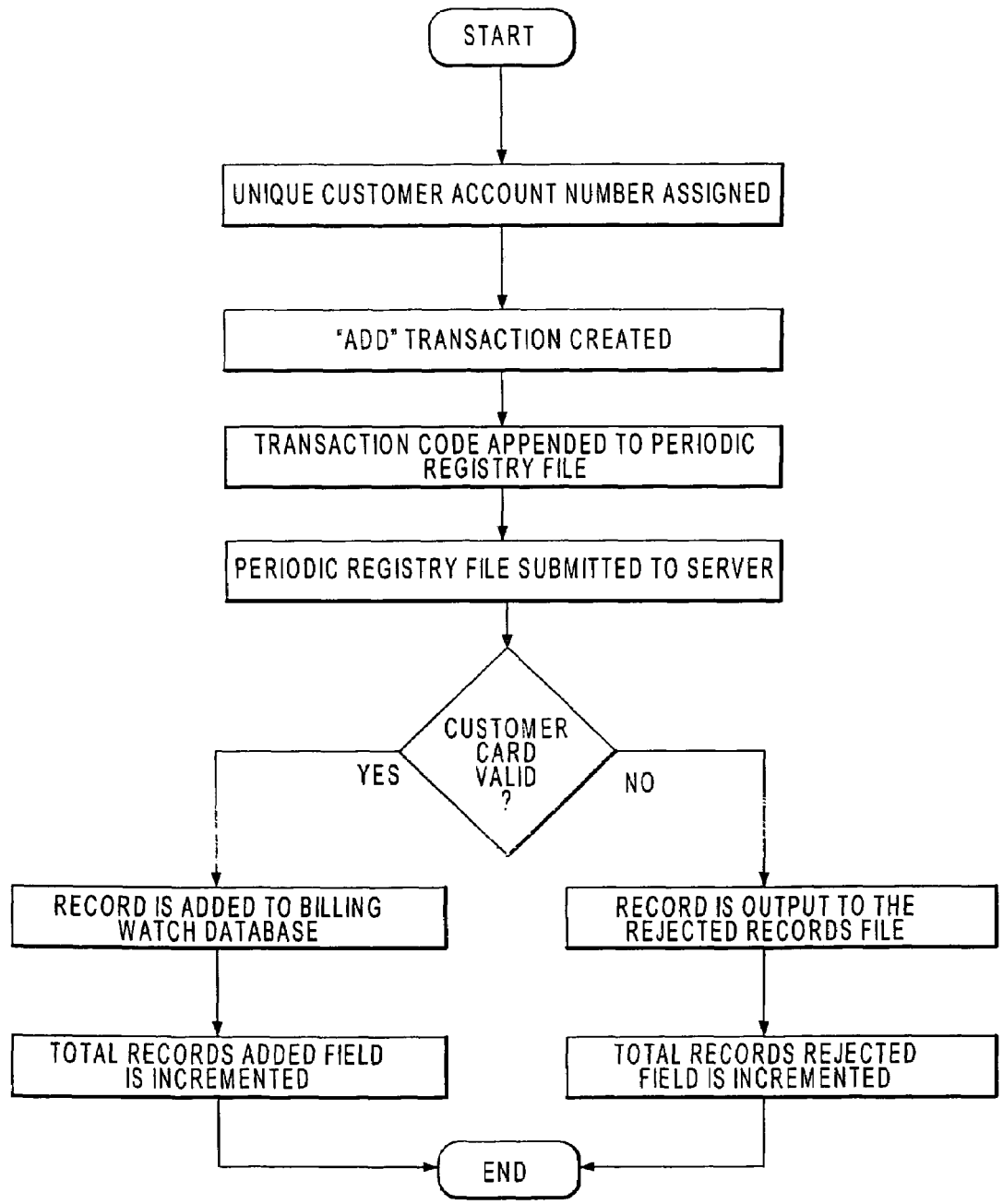

In addition to the above transactions, it may be desirable for a merchant to perform two merchant transactions for the same customer number, such as, where the merchant may wish to submit a new customer number when the merchant has reassigned the customer's merchant-assigned customer number (e.g., account number). In this case, the merchant will want to change only the account number associated with the customer on the billing database location. As noted with respect to Table 2 above, this transaction may be performed in two parts. FIGS. 7A and 7B illustrates how the two functions-may be performed on the database. In particular, the merchant may first create a merchant "delete" transaction (FIG. 7A) followed closely by an "add" transaction (FIG. 7B). As can be seen, the merchant "delete" transaction of FIG. 7A and the "add" transaction of 7B are such that they may be performed in substantially the same way as similar steps of FIGS. 3 and 5. As such, the descriptions of FIGS. 7A and 7B will not be repeated here in the interest of brevity. That is, it should be understood that a server 110 which changes a customer's number in accordance with a merchant's request may perform the steps associated with the merchant's "delete" and "add" commands as described above.

With reference now to FIG. 4, at the completion of the merchant transaction requests, a Summary Report is generated by server 110 (step 410). The Summary Report includes a compilation of information related to the actions performed on the database 116 in accordance with the merchant request. Accordingly, the Summary Report may have a listing of all files which were added, deleted, or changed as a result of the submission of the periodic report. The listing may include a string field, wherein each accepted transaction is shown as having been accepted or performed. In addition, the Summary Report may have a counter for each one of the merchant grouped transactions (e.g., "add," "delete" or "change") indicating the number of times the grouped transaction was performed. For example, where the server 10 has added to database 116 five files as a result of the periodic registry report, the counter may indicate under the "add" field that indeed five files were added. In this way, the merchant may discern the percentage of accepted "add" transactions to rejected "add" transactions.

In addition, the Summary Report may have a separate file for returning to the merchant the files which were rejected on the database. These files may be stored in a rejected file and provided to the merchant independent of the Summary Report or the file may be appended to the Summary Report indicating which files were rejected on the database. Upon receipt of the rejected files information the merchant may check and correct any transaction on the rejected file as desired and resubmit the corrected transactions with the next periodic registry report to be submitted by the merchant.

As with the merchant transactional groupings, the rejected file may contain a rejected counter for enumerating the number of files rejected on the database. It should be noted that in one embodiment of the present invention, the rejected counter may be used to control the quality of the periodic registry files provided to the server 110 by the merchant system 102. That is, where a merchant's registry file causes the server 110 to perform multiple rejects with respect to database 116, the may notify the merchant system that the registry file may be unacceptable for processing by the server 110. Such a situation may arise when the registry file is corrupt, contains a proliferation of errors, or is incompatible with the database 116 processing system, and the like. To aid in notifying the merchant that the registry file is unacceptable for processing, the server may include a rejection threshold. The rejection threshold may be a predetermined number of rejections after which the server 110 will no longer. attempt to process the merchant's periodic registry file. Upon reaching or surpassing the rejection threshold, the server may take some action to notify the merchant that a problem has occurred with his periodic registry file. Typical actions may include placing all of the merchant's requests in a rejection file and appending the file to the Summary Report which may be downloaded by the merchant system 102.

The providing of the Summary Report may typically be done periodically (e.g., daily, weekly, or monthly, etc). In accordance with one embodiment, the server 110 places the Summary Report on a pick-up directory on server 110 on a periodic basis (e.g., daily, weekly or monthly, etc.). The merchant system 102 then is able to access the pick-up directory and retrieve the Summary Report in accordance with any of the accepted file retrieval protocols. In one aspect of this embodiment, the server 110 may include a predetermined time period during which a Summary Report will be allowed to be stored in the pick-up directory. For example, a Summary Report which has been stored in the pick up directory for more than five days may be removed from that directory entirely. In another aspect of the embodiment, where five successive days of Summary Reports are stored in the pick-up directory, the server 110 may remove all five days of Summary Reports from the pick-up directory and notify the merchant accordingly.

In another embodiment, the Summary Report may be delivered to the merchant system 102 once its compilation is complete (e.g., daily, weekly or monthly), eliminating the need for the merchant system to sign onto the server 110 and download a waiting file.

Figure 8:
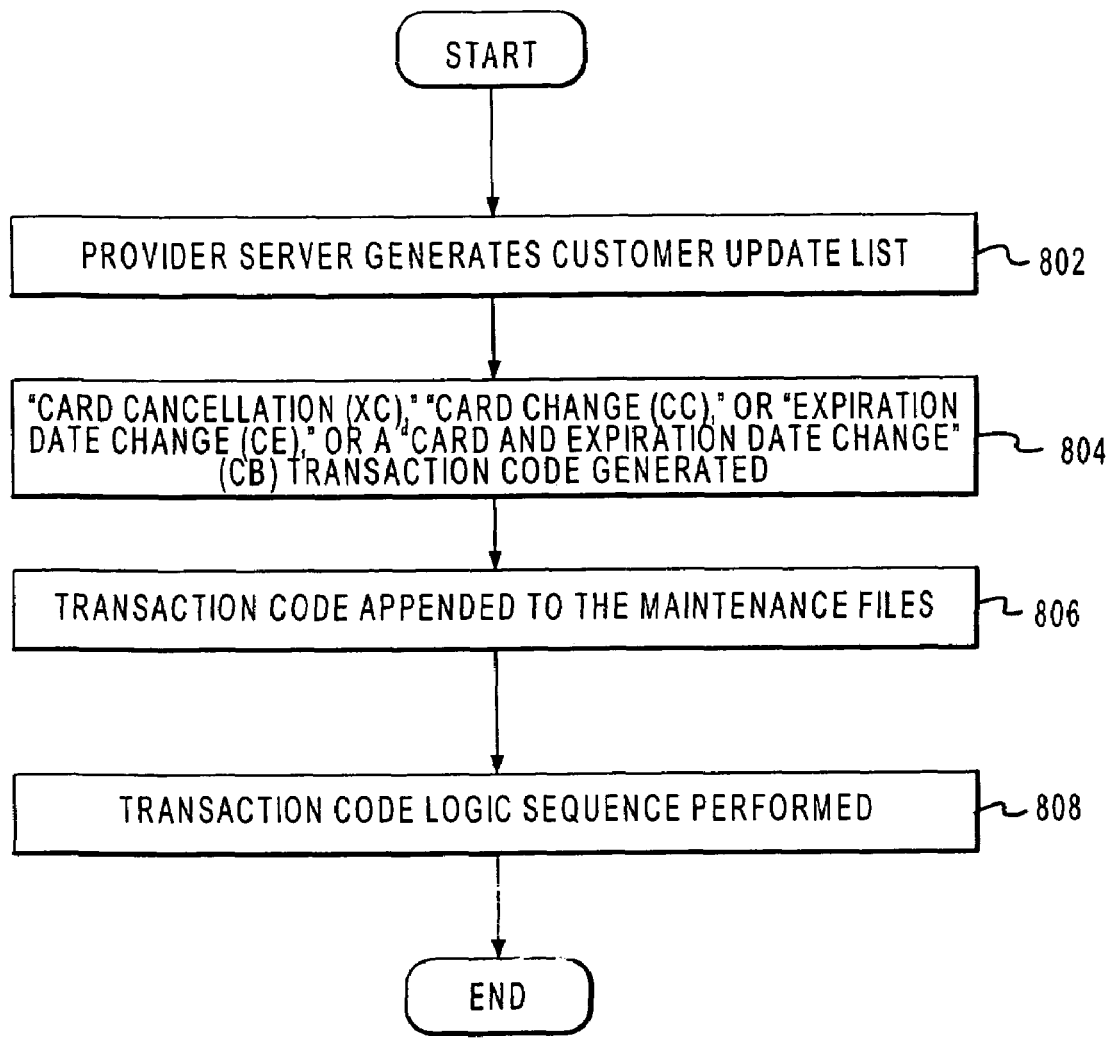
FIG. 8 is an exemplary embodiment of a process for updating a merchant billing database location and generating a periodic maintenance report for updating a corresponding merchant recurrent billing customer database in response to a provider transaction code-in accordance with the present invention.

Another embodiment of the invention addresses the case where the customer credit card information or status is altered unbeknownst to the merchant system 102. For example, the credit card provider may cancel a customer's credit card privileges, or change a customer's credit card number or expiration date, and the like. In that instance, the credit card provider may alter the customer information on the provider customer database independent of any action taken by the merchant. The server 110 may then generate a maintenance file containing the new customer information to be provided to the merchant system 102. To insure accuracy and consistency between the merchant customer recurrent billing database stored on the merchant system 102 and the merchant billing database location on the database 116, the maintenance file may preferably be downloaded periodically (e.g., daily, weekly, monthly, etc.) by the merchant. The merchant may further use the daily maintenance file to update the merchant's recurrent billing customer database on the merchant system 102. FIG. 8 is a flowchart of an exemplary process enabling the server 110 to generate a maintenance file in accordance with the present invention. It should be noted that the server may generate the maintenance file on a periodic basis (e.g., daily, monthly, weekly, etc.) or any other basis as necessary (e.g., on request of the card provider or the merchant).

As shown in FIG. 8, where a credit card provider has altered a credit card customer's information (e.g., card status, card number or expiration date) the provider may generate a file containing the altered credit card information (step 802). The server 110 may then generate a transaction code for use by the server 110 and/or by the merchant in updating the customer information stored in the merchant's billing database location (step 804). The server may then append the customer information and related transaction code to the maintenance file which may be downloaded to the merchant system (step 806). Upon downloading the maintenance file, the merchant may perform a sequence of steps designed to insure that the merchant's recurrent billing customer database is updated in accordance with the information contained on the periodic maintenance report (step 806).

In one embodiment, the merchant may submit a periodic registry report containing the updated information appended with the appropriate merchant transaction code, which in turn may prompt the server 110 to perform the desired sequence of steps for updating the merchant billing database location (e.g., "change" sequence performed by server 110 for change transaction). In another embodiment, the customer information is updated on the merchant billing database location subsequent to, or simultaneous with, the alteration of the customer information on the provider database by the credit card provider.

Table 3 is a list of typical provider transaction codes which may be used with the present invention.

TABLE 3

Provider Transaction Code

| Transaction Type | Transaction Code | Event That Initiates This Transaction |
|---|---|---|
| Card Cancellation | XC | Cardmember/Provider cancels card |
| Card Change | CC | New credit card number issued |
| Expiration Date Change | CE | The credit card expiration date changed. (Card numbers do not change when only the Card Expiration Date changes) |
| Card Number and Expiration Date Changes | CB | New card number and expiration date issued to card holder |

As previously noted, each provider transaction code is appended to the customer information provided to the merchant in the periodic maintenance report. Each provider transaction code may further prompt the merchant system to perform a sequence of steps for updating the merchant customer database to reflect the changes made by the provider. FIGS. 9–12 depict typical sequences of steps which may be performed by the merchant system 102 in response to the above exemplary transactions.

Figure 9:
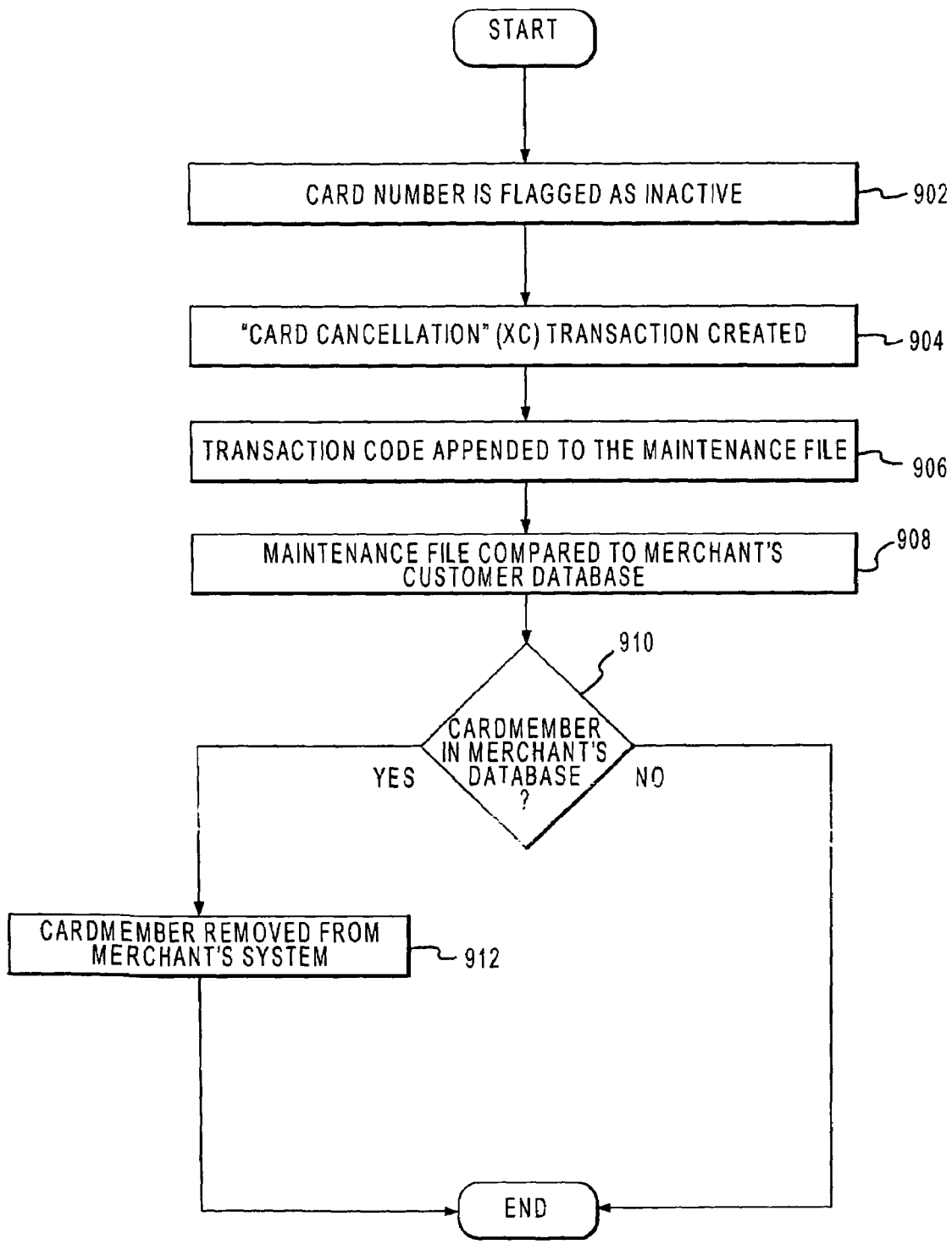
FIG. 9 is an exemplary embodiment of a process for performing a provider "card cancellation" transaction in response to a provider "card cancellation" transaction code in accordance with the present invention.

With reference to FIG. 9, what is shown are process steps which may be performed in an exemplary "card cancellation" transaction ("XC") in accordance with this present invention. As shown, the provider may indicate that a particular card number is now inactive and should be purged from the billing database location after 180 days (step 902). For example, a marker card number (e.g., a digital flag or other indicator) may be appended to the card number identifying the card number for cancellation. The server 110 may then create a "card cancellation" transaction by appending to the card number a cancellation ("XC") transaction code (TC) (step 904). The server may then append the transaction to the daily maintenance file for downloading to the merchant system 102 (step 906). The merchant system 102 may then execute a program file comparing the maintenance file to the merchant customer database (step 908 and 910). If the cardmember is found on the merchant customer database, the merchant system 102 removes the cardmember information from the merchant system files. If the cardmember information is not found on the merchant system 102 customer database, then the merchant system 102 does not perform the removal action.

Figure 10:
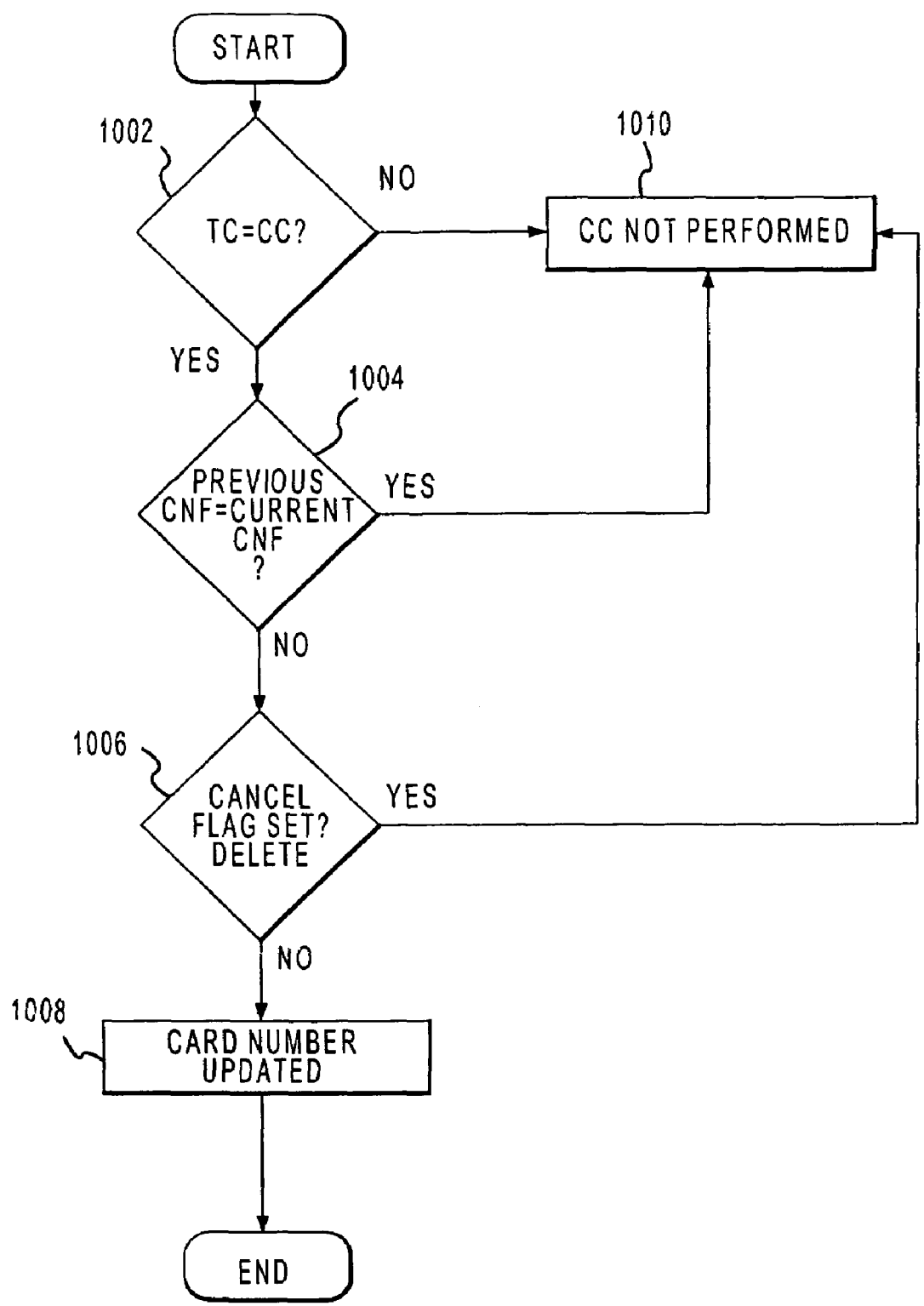
FIG. 10 is an exemplary embodiment of a process for performing a provider "change card number" transaction in response to a provider "change card number" transaction code in accordance with the present invention.

Referring now to FIG. 10, what is shown is an exemplary process sequence which may be performed by merchant system 102 in response to "change card number" ("CC") provider transaction. Upon receiving the periodic maintenance report from database 116 via server 110, merchant system 102 may check to see if the provider transaction code for a particular customer number corresponds to the "change card number" transaction (e.g., "CC") (step 1002). If the provider transaction code corresponds to the change card number transaction "CC", the process may require the merchant system 102 to evaluate whether the existing credit card number and the proposed credit card number provided by server 110 are the same, (e.g., card number file (CNF)) (step 1004). In one embodiment, where the numbers are not equal, then the system may check to ensure that the credit card number corresponding to the "CC" transaction has not been targeted for cancellation (step 1006). Where the card number has not been targeted for cancellation by server 110, the merchant system 102 may update the card number on the merchant system 102 as required by the maintenance file (step 1008).

It should be noted, however, that the process disclosed in FIG. 10 may be further designed to ensure that the "change card number" transaction is performed only when desired. For example, the transaction may not be performed if the transaction code does not initiate the change card number sequence (step 1002), the previous card number and the proposed card number are the same (e.g., the change has already been made) (step 1004), or if the card is marked for cancellation (step 1006).

FIG. 11 shows an exemplary process which may be performed by merchant system 102 in response to a "change expiration date" ("CE") provider transaction code (TC). As with the "change card number" transaction ("CC"), the "change expiration date" transaction ("CE") may call for the merchant, system 102 to ensure that the change expiration "CE" transaction code is present on the maintenance file (step 1102). Where the "change expiration date" transaction code exists, the merchant system 102 may determine whether the expiration date for the customer information as it is stored in the merchant customer database is blank (step 1104). That is, the merchant system 102 may determine whether an expiration date exists for a particular customer credit card number on the merchant system 102. If no expiration date exists, the merchant system 102 may determine whether the customer number file has been targeted for cancellation by server 110 (step 1106). If the customer file is not to be cancelled, then the expiration date corresponding to the customer file may be updated (step 1108).

Notably, in accordance with the process steps of FIG. 4, the expiration date corresponding to a customer number may be updated when the file already contains an expiration date. For example, upon evaluating whether the expiration date field (EDF) of a customer information file is targeted for the "CE" transaction (step 1104) the merchant system 102 may further evaluate whether the proposed new EDF is greater (e.g., later in time) than the existing expiration date (ED) (step 1110). If the proposed EDF is greater than the existing expiration date, then the merchant system may determine if the customer number has been targeted for cancellation (step 1106) and change the expiration date if the customer file is not to be cancelled (step 1108).

However, as with the change number ("CC") process shown in FIG. 11, the process disclosed in FIG. 11 may be further designed to ensure that the change expiration date transaction is performed only when desired. For example, the "CE" transaction may not be performed if the transaction code does not initiate the change expiration date sequence (step 1102), the proposed expiration date is less than the existing expiration date (e.g., the proposed expiration date is earlier in time than the existing expiration date) (step 1110), or if the card is targeted for cancellation (step 1106). In addition to the aforementioned provider transactions described above, it may also be desired to change both the credit card number and the expiration date corresponding to a customer number in a merchant customer database. Such a situation may arise when the customer has lost or misplaced his card and the provider issues the customer a replacement credit card having a new credit card number and expiration date. In that instance, it may be advantageous for the merchant to be able to perform a process capable of changing his customer database to reflect the information contained on the replacement credit card.

FIG. 12 illustrates an exemplary process which may be performed by the merchant to change both the credit card number and the expiration date corresponding (e.g., "CB" transaction) to a recurrent billing customer on system 102. As shown in FIG. 12, the merchant system 102 may first determine if the "CB" transaction is present on the maintenance file (step 1202). Where the "CB" transaction is present, the "CB" transaction may be performed in two sequences where the merchant system 102 may determine if the criteria exist for changing the expiration date (step 1206) and also if the criteria exist for changing the credit card number (step 1224). Consequently, merchant system 102 may establish a counter n for tracking the number of times the "CB" transaction sequence is performed. For example, since the "CB" sequence is to be performed twice (e.g., one time for "CE" transaction and a second time for "CC" transaction), the counter may be initially set at one "1" (step 1204) and later incremented by one until the counter n indicates that the sequence has been performed twice (e.g., n=2) (steps 1210 and 1212). Once the "CB" sequence has been performed for the second time, then the counter may be reset to zero prior to performing subsequent "CB" transactions.

Once the merchant system 102 determines that a "CB" transaction exist on the periodic maintenance report (step 1202), the merchant system 102 may then evaluate whether the "change expiration date" criteria are satisfied (step 1206) such that the system 102 would perform a "change expiration date" process and update the expiration date in the merchant customer database (step 1208). An exemplary "change expiration date" process may be substantially similar to that described with respect to FIG. 11.

As noted, at the completion of the "change expiration date" process, the merchant system may increment the counter n (step 1210) and determine if the "CB" process is complete. That is, the system 102 may determine whether the "CB" process has been performed twice (n=2) such that the system is made aware that the criteria for both the "change expiration date" ("CE") and the "change credit card number" ("CC") have been evaluated. Where the counter n does not indicate that the merchant system 102 has evaluated both the "CE" and the "CC" criteria, the system 102 may then perform the criteria that has yet to be performed (step 1212). For example, where the system 102 has evaluated whether the "CE" criteria are met, but has not evaluated whether the "CC" criteria are met, the system 102 may seek to evaluate the "CC" criteria. Similarly, where the system 102 has evaluated whether the "CC" criteria are met, but has not evaluated whether the "CE" criteria are met, the system 102 may seek to evaluate the "CE" criteria. In particular, where the "CC" criteria has not been evaluated, the system 102 will evaluate the "CC" criteria (step 1224) and, if the "CC" criteria are met, the merchant system 102 may update the card number (step 1222) on the merchant customer database.

It should be understood that the present invention has been described above with reference to various exemplary embodiments and process steps as they concern database updating. Those skilled in the art, however, will recognize that changes and modifications may be made to the exemplary embodiments and process steps without departing from the scope of the present invention. For example, the various processing steps, as well as the components for carrying out the processing steps, may be implemented in alternate ways depending upon the particular application or in consideration of any number of cost functions associated with the operation of the system, e.g., various of the steps may be deleted, modified, or combined with other steps, such as providing that a blank expiration date field (EDF) is acceptable in applications involving in a predetermined processing. In particular, updates to the merchant billing database location may take place before the periodic maintenance report is provided to the merchant system. Alternatively, the merchant billing database location may be updated after the maintenance file has been provided to the merchant system and in response to the merchant's periodic registry report. In addition, the rejected records file may be provided to the merchant as a sub-file of the Summary Report, or it may be provided to the merchant as a file independent of any other provided files. Moreover, it should be understood that although the database updates are described herein as being updated automatically using the provider server or merchant system, updates and alterations to the merchant customer database and the merchant billing database location may be performed manually.

Further, it should be understood that the merchant billing database location may be updated in response to either a merchant transaction code provided with the periodic (e.g., daily, weekly, monthly, etc.) registry or in response to an alteration made to the credit card provider's main database. That is, where the provider has altered his main database (e.g., cancelled a customer's credit card privileges or issued a replacement card) the server 110 may update the merchant billing database location in response to a provider transaction code.

Further, it should be noted that other merchant or provider transactions may be performed for the purpose of updating the merchant billing database location. For example, where a merchant submits an outdated credit card number as a part of an "add" transaction, the provider may add the credit card number to the merchant Billing Watch Database location and retain the number as a record which may be ineligible for updating.

Further still, it should be noted that while the merchant recurrent billing credit card information update system described above is suitably for use by any suitable credit card provider, the system is not limited to use with credit card databases. For example, the system may be used with any system wherein a merchant has established a recurrent billing database, such as, recurrent billing to a checking or savings account. In this instance, the system described above may be used to update customer checking account numbers and billing addresses stored in a merchant customer database as the need arises.

Furthermore, while the present invention has been described with respect to a provider server for managing a database of provider customer subscribers, the invention is not to be so limited. For example, a server which manages a database containing customer information provided by multiple transaction card providers, is contemplated to be within the scope of the invention. In this embodiment, a server managing the multiple transaction card providers may operate in substantially a similar way as the provider server described herein.

These and other changes or modifications are intended to be included within the scope of the present invention, as set forth in the following claims.

What is claimed is:

1. A method of updating a merchant customer transaction account database using a computer network, comprising:

receiving a first plurality of customer transaction account records;

pre-authorizing said first plurality of customer transaction account records, storing said pre-authorized said first plurality of customer transaction account records on a local database, said local database being maintained by a local process server;

storing said pre-authorized said first plurality of customer transaction account records in a remote database, said remote database being accessed through a remote process server;

providing a periodic registry file to said remote process server, said periodic registry file comprising a update request to said pre-authorized plurality of customer transaction account records, said process server comparing said periodic registry file to said pre-authorized said first plurality of customer transaction account record, and updating said pre-authorized said first plurality of customer transaction account records according to a predetermined order of process steps, said remote process server generating a maintenance file in response to said comparison of said periodic registry file to said pre-authorized said first plurality of customer transaction account record;

providing said maintenance file to said local process server, said local process server comparing said maintenance file to said pre-authorized said first plurality of customer transaction account records on a local database; and updating said pre-authorized said first plurality of customer transaction account records on a local database in response to said maintenance file.

2. A method of updating a merchant customer transaction account database using a computer network, comprising:

receiving a first plurality of customer transaction account records;

storing said first plurality of customer transaction account records on a local database, said local database being maintained by a local process server;

storing said first plurality of customer transaction account records in a remote database, said remote database being accessed through a remote process server;

providing a periodic registry file to said remote process server, said daily registry file comprising a update request to said plurality of customer transaction account records, said process server comparing said plurality registry file to said first plurality of customer transaction account record, and updating said first plurality of customer transaction account records according to a order of process steps, said remote process server generating a maintenance file in response to said comparison of said periodic registry file to said first plurality of customer transaction account records;

providing said maintenance file to said local process server, said local process server comparing said maintenance file to said first plurality of customer transaction account records on a local database; and updating said pre-authorized said first plurality of customer transaction account records on a local database in response to said maintenance file.

* * * * *

UNITED STATES PATENT AND TRADEMARK OFFICE
CERTIFICATE OF CORRECTION

| | | |
|---|---|---|
| PATENT NO. | : 6,997,378 B2 | Page 1 of 1 |
| APPLICATION NO. | : 10/843732 | |
| DATED | : February 14, 2006 | |
| INVENTOR(S) | : Susan Phillips et al. | |

It is certified that error appears in the above-identified patent and that said Letters Patent is hereby corrected as shown below:

On the Title page, section (75) Inventors, please delete "Fred Griggs" and insert therefor
--Fred Grigg III--.

Signed and Sealed this
Ninth Day of October, 2012

David J. Kappos
*Director of the United States Patent and Trademark Office*